Figures 7, 8:
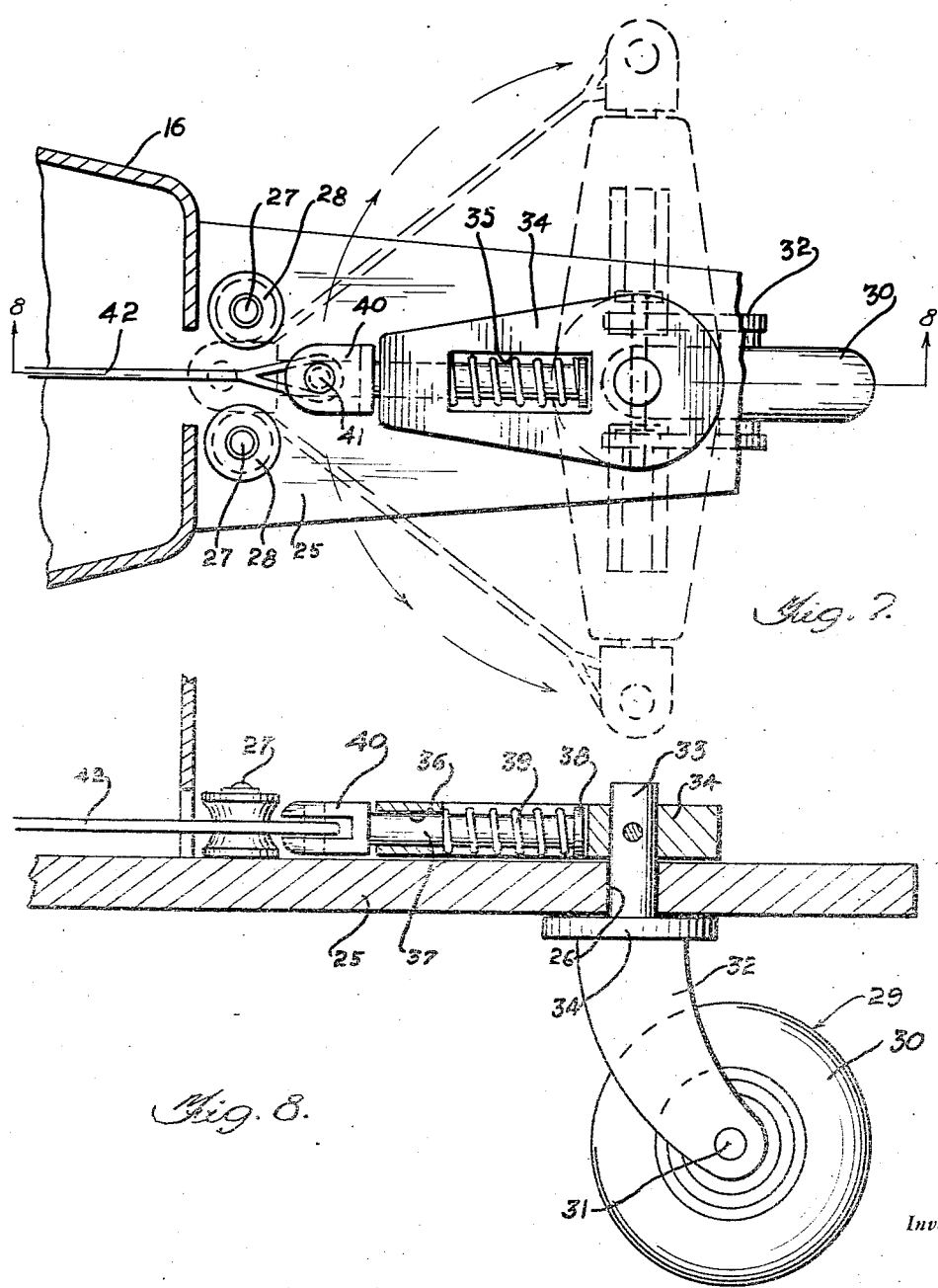

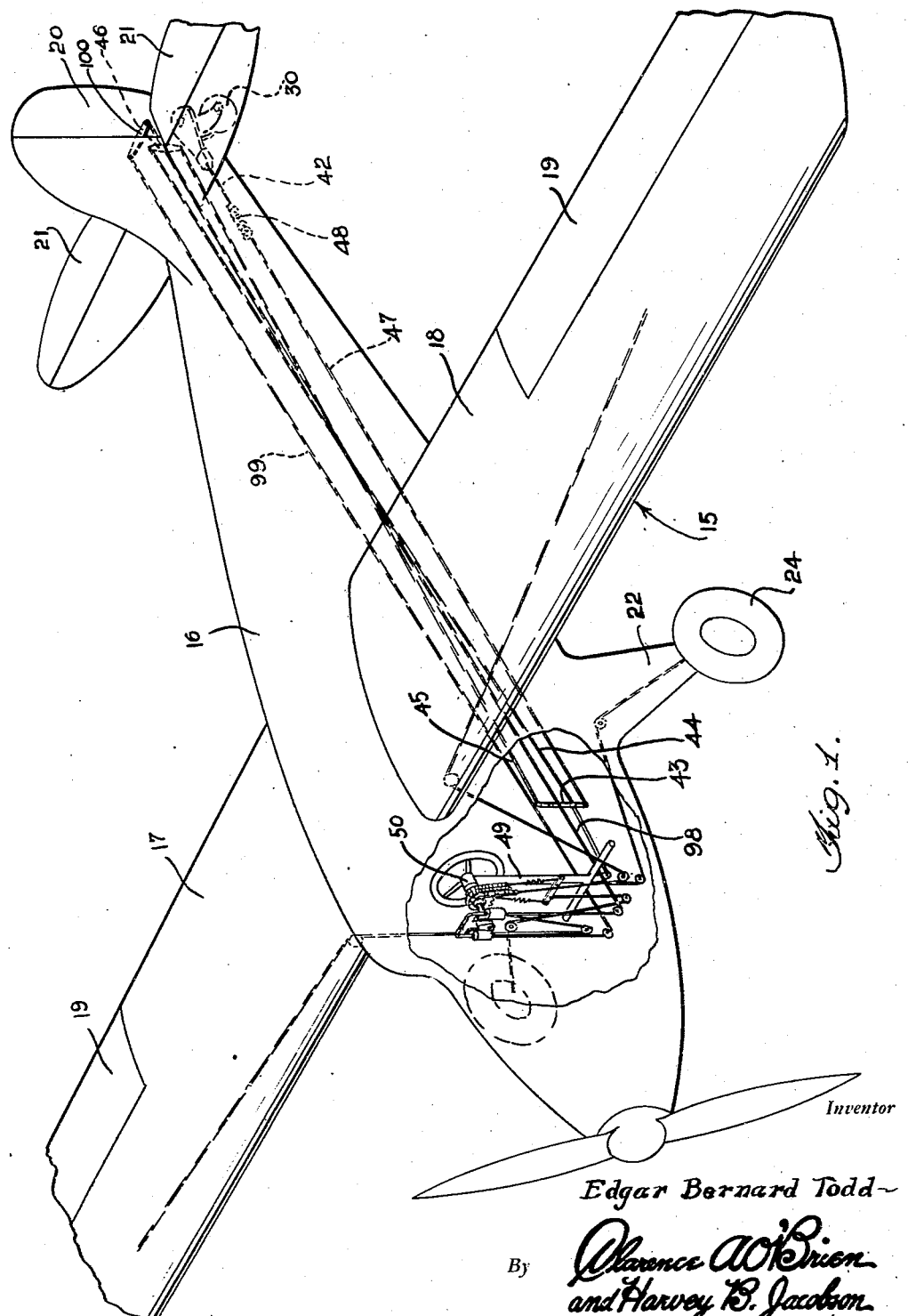

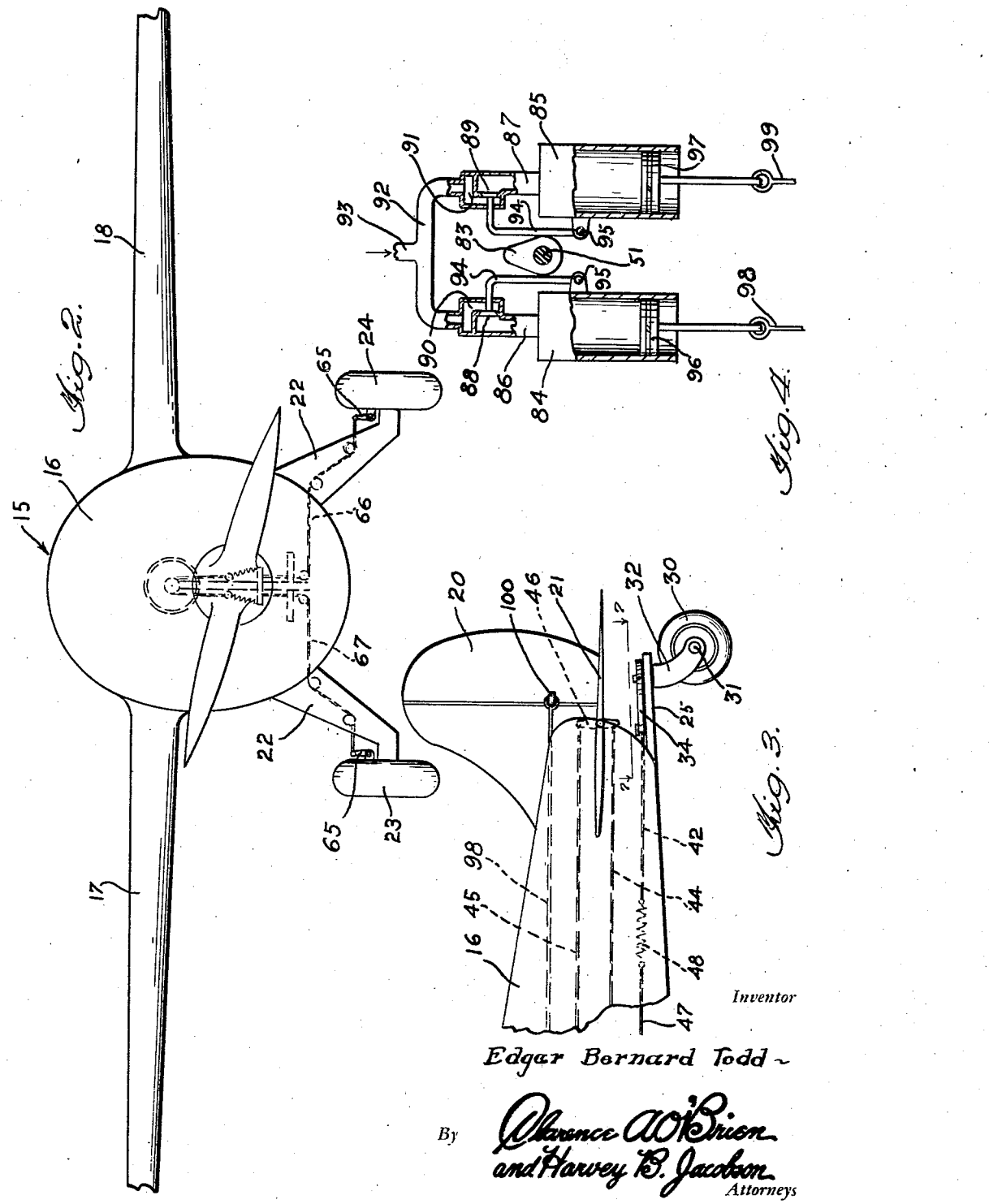

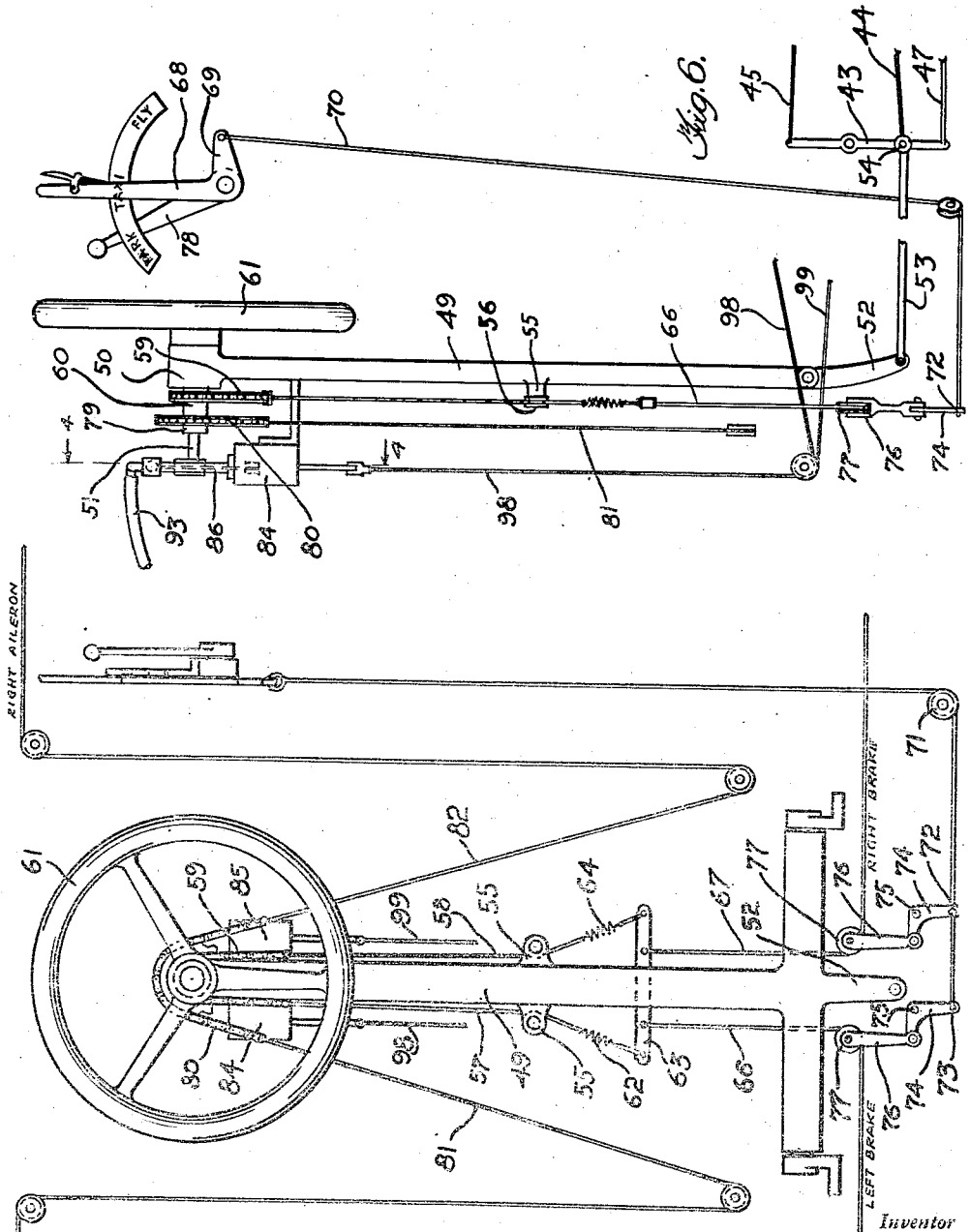

Dec. 28, 1948.  E. B. TODD  2,457,508
AIRCRAFT CONTROL SYSTEM FOR CONTROL
SURFACES AND WHEEL BRAKES
Filed July 9, 1945  4 Sheets-Sheet 4

Inventor
Edgar Bernard Todd
By Clarence A. O'Brien
and Harvey B. Jacobson
Attorneys Patented Dec. 28, 1948

2,457,508

UNITED STATES PATENT OFFICE 2,457,508

AIRCRAFT CONTROL SYSTEM FOR CONTROL SURFACES AND WHEEL BRAKES

Edgar Bernard Todd, Billings, Mont.

Application July 9, 1945, Serial No. 603,974

6 Claims. (Cl. 244—50)

This invention relates to improvements in aircraft, and more particularly to a control system for aircraft.

The principal object of the invention is to simplify the control of an airplane both while on the ground and while in flight.

Another object is to adapt such controls to any conventional type of aircraft, such as those employing a rudder, an elevator, ailerons, and landing wheels.

The above and other objects may be obtained by employing this invention which embodies among its features an airplane having a pair of landing wheels, a tail wheel of the caster type, a brake for each landing wheel adapted to be actuated independently of that on the other landing wheel, means actuated by a control wheel for operating the rudder, the ailerons, and the elevator of the airplane, means connected to the control wheel for operating the brakes on the landing wheels coincidentally with the operation of the rudder, means associated with the control wheel for locking the tail caster wheel when the control wheel is moved into position for landing, and means whereby the brake-actuating mechanism is rendered ineffective when the aircraft is in flight.

Other features include a spring-pressed latch bolt which is adapted to be projected into locking position by moving the elevators to landing position, and automatically to be released when the elevators are moved to lifting position.

Still other features embody means connected to and actuated by the aircraft throttle lever for disengaging the brake-actuating mechanism when the throttle lever is moved into flying position.

In the drawings:

Figure 1 is a perspective view of an aircraft equipped with this particular control system, Figure 2 is a front view in elevation of Figure 1, Figure 3 is a fragmentary side view of the rear end or tail of the aircraft, Figure 4 is an enlarged detail sectional view of the rudder control mechanism, Figure 5 is a diagrammatic view of the steering or control wheel, its pedestal and the control cable connected thereto, Figure 6 is a side view of Figure 5, Figure 7 is an enlarged detail plan view of the caster wheel and its control mechanism, Figure 8 is a longitudinal sectional view taken on the line 8—8 of Figure 7.

Referring to the drawings in detail, and aircraft designated generally 15 comprises the usual fuselage 16 to the forward end of which are attached the customary wings 17 and 18. Each wing is provided adjacent its outer end with the usual aileron 19 and secured to the rear end or tail of the fuselage 16 is the usual rudder 20. The tail or rear end of the fuselage 16 is also equipped with the usual elevators 21, and mounted on suitable brackets 22 adjacent the forward end of the fuselage 16 are landing wheels 23 and 24.

Attached to the rear end of the fuselage and extending rearwardly therefrom is a bracket 25 having formed near its rear end an aperture 26 in which the caster wheel, to be more fully hereinafter described, is pivoted. Rotatably mounted on studs 27 projecting upwardly from the top surface of the bracket 25 are guide rollers 28 which are spaced from one another, as illustrated in Figure 7, for the reception of the latch bolt carried by the caster wheel, as will be more fully hereinafter set forth.

The caster wheel is designated generally 29, and comprises a wheel 30 mounted to rotate about an axle 31 carried in a forked yoke 32, the upper end of which is provided with a pivot stud 33 which is received in the opening 26, as illustrated in Figure 8. A suitable bearing collar 34 surrounds the stud 33 at its junction with the yoke 32.

Secured to the pivot 33 on the upper side of the bracket 25 is an arm 34 which is provided with a longitudinal slot 35, the outer end of which communicates through a bore 36 with the end of the arm. Slidably mounted in the bore 36 is a latch bolt 37 carrying at its inner end a head 38, and extending between the head 38 and the end wall of the slot 35 nearest the free end of the arm 24 is a compression coil spring 39 which, as shown, normally holds the latch bolt in retracted position. Carried at the outer end of the latch bolt, adjacent the free end of the arm 34, is a yoke 40 between the arms of which extends a cross-pin 41 to form an anchor for one end of a cable 42 which leads forwardly within the fuselage 16 to the control mechanism to be more fully hereinafter described.

Mounted to swing about a horizontal pivot substantially in alignment with the longitudinal axis of the fuselage 16 is a lever 43, adjacent opposite ends of which are attached cables 44 and 45 (Fig. 1) which lead rearwardly to the opposite terminal of a control lever 46 which is connected to and adapted for controlling the elevators 21. A cable 47 leads from the lower end of the lever 43 and is connected by means of a yielding connection such as a spring 48 to the cable 42 previously described. It will then be seen that as the lever 43 is moved to cause the elevators to lift the plane, the latch bolt 37 will be moved forwardly, in the dotted line position illustrated in Figure 7, between the rollers 28 so as to lock the wheel 30 against pivotal movement about the axis and pivot 33. In this way the caster wheel 30 is held in a straight-away position so as to not interfere with the proper take-off of the plane.

Mounted to pivot about a horizontal axis adjacent the forward end of the fuselage 16 is a pedestal 49 carrying at its upper end a bearing 50 in which a shaft 51 is rotatably mounted. Projecting downwardly below the horizontal axis about which the pedestal 49 is pivoted and formed integrally with said pedestal 49 is an arm 52 to the lower end of which is pivoted one end of a link 53, the opposite end of which is pivoted, as at 54, to the lever 43 previously described. It will thus be seen that as the pedestal 49 is swung about its horizontal pivot, the lever 43 will likewise be moved to govern the movement of the elevators 21. Attached to the pedestal 49 intermediate its ends is a pair of oppositely extending arms 55 carrying at their extreme outer ends guide rollers 56 over which cables 57 and 58 are adapted to run. The upper end of each cable 57 is connected to a sprocket chain 59 which runs over and engages a sprocket 60 fixed to the shaft 51, on one side of the bearing 50. Carried by the shaft 51 on the opposite side of the bearing is a control wheel 61, and it will thus be seen that as the control wheel is rotated, pull on one or the other of the cables 58 will be exercised. The end of the cable 57 opposite that which is connected to the sprocket chain 59 is connected through the medium of a spring 62 to one end of an equalizing bar 63. The opposite end of this equalizing bar is connected through the medium of a spring 64 to the end of the cable 58 opposite that which is attached to the sprocket chain 59. It will thus be seen that as the wheel 61 is rotated, the equalizing bar 63 will be moved.

As illustrated in Figure 2, each of the wheels 23 and 24 is provided with a suitable brake mechanism, each carrying a lever 65 by means of which its application to its respective wheel may be governed. Leading from the equalizing bar 63 near the end of which a spring 62 is attached is a cable 66 and a similar cable 67 leads from the bar 62 near the end to which the spring 64 is connected. The cable 67 is led over suitable guide pulleys to the lever 65 controlling the brake mechanism which is associated with landing wheel 23, while the cable 66 leads over suitable guide pulleys to the lever 65 controlling the brake-actuating mechanism for wheel 24. It will thus be seen that as the control wheel 61 is rotated, one or the other of the levers 65 will be actuated to control the application of braking power to one or the other of the wheels 23 or 24. In this manner the direction in which the plane or aircraft travels when grounded may be governed by manipulation of the wheel 61.

As in conventional aircraft, I provide a throttle lever 68 by means of which the speed and power of the engine with which the aircraft is equipped may be governed. To my throttle lever 68 which I attach a cable 70. This cable is led over a suitable guide roller 71 and is connected, as at 72, and 73, to one arm of a pair of bell crank levers 74 which are arranged to swing about fixed pivots 75. The opposite arm of each bell crank lever 74 carries a yoke 76 between the arms of which is pivoted a guide roller 77. These guide rollers are arranged in such a manner as to engage the cables 66 and 67 and exert tension thereon through the medium of the bar 63 and the springs 62 and 64 when the throttle lever 68 is moved to taxi or parked position. When the throttle lever is moved to flying position, however, the tension on the cable 70 is relaxed so as to permit the springs 64 and 62 to contract with the result that while the aircraft is in flight, little braking effect is exerted on wheels 23 and 24; likewise, when the aircraft is landing and taxiing about, the brakes of the wheels 23 and 24 are rendered less effective. Not only do I provide for the automatic regulation of the braking power on the wheels 23 and 24, but I provide a second lever 78 by means of which the arm 69 may be manipulated to relax the tension on the cable 70 under manual control and independently of the throttle lever 68.

In order to effect proper steering and balance of the aircraft when in flight, I provide on the shaft 51 adjacent the sprocket 60 a second sprocket 79 over which a suitable sprocket chain 80 is trained. Opposite ends of the chain 80 are connected by cables 81 and 82 to the ailerons carried by the wings 18 and 17, respectively. It will thus be seen that as the wheel 61 is rotated, the ailerons will be moved to proper position to preserve the desired balance of the aircraft when in flight.

A control cam 83 is attached to the shaft 51 for rotation in unison with sprockets 60 and 79 for actuating the vacuum rudder control, to be more fully hereinafter described, in unison with the movement of the ailerons and the application of the brake. Mounted on opposite sides of the shaft 51 is a pair of cylinders 84 and 85, respectively. Leading from the closed ends of the cylinders are tubular connections 86 and 87, respectively, by means of which communication is established with valves 88 and 89, which, in turn, are connected through chambers 90 and 91 with a manifold 92 which, in turn, is connected through a branch 93 with the intake manifold of the engine with which the aircraft is powered. It will thus be seen that a vacuum is established in the chambers 90 and 91 which, when one or the other of the valves 88 or 89 is opened, causes the interior of its respective cylinder to be evacuated. The valves 88 and 89 are provided with L-shaped valve stems 94 which are pivoted, as at 95, to the cylinders 84 and 85 in such a manner as to be engaged by the cam 83 as the shaft 51 is rotated. A piston 96 is adapted to operate within the cylinder 84 and a similar piston 97 operates within the cylinder 85. The piston rods of the respective pistons are connected through cables 98 and 99, respectively, to opposite ends of a lever 100 by means of which the rudder 20 is moved about its vertical pivot. It will thus be seen that as one or the other of the cylinders 84 or 85 is evacuated, one or the other of the pistons 96 or 97 will be moved inwardly to exert pull on one or the other of the cables 98 or 99, and consequently move the rudder to effect the steering of the aircraft when it is in flight. It is to be understood, of course, that where the vacuum rudder or steering equipment is employed as an auxiliary to the conventional steering equipment of an airplane, a suitable manually controlled valve may be interposed in the vacuum line 93 by which the mechanism just described may be rendered inoperative.

It will be appreciated that the proper ratio between the sprockets 60 and 79, and the cam or eccentric 83 is to be preserved to effect proper coordination of all component parts of the steering equipment of the aircraft.

From the foregoing it will be seen that the operation of the rudder 20 is rendered coincidental with the operation of the ailerons and when the aircraft is grounded and being parked, the rudder and brakes on the wheels 23 and 24 likewise are coincidental in operation. It will also be apparent that as soon as the throttle control lever is moved to flying position, less braking effect is transmitted to the brakes on the wheels 23 and 24 by the movement of the control wheel 61. It is also evident that the movement of the pedestal 49 about its horizontal pivot not only governs the movement of the elevators 21, but also controls the locking or releasing of the caster wheel 30 to insure its remaining in proper position for landing and yet may be readily freed for turning about its pivot after the aircraft has been safely grounded and to facilitate its maneuvering when resting on its landing wheels.

While in the foregoing there has been shown and described the preferred embodiment of this invention, it is to be understood that minor changes in the details of construction, combination and arrangement of parts may be resorted to without departing from the spirit and scope of the invention as claimed.

I claim:

1. Aircraft which includes a pair of spaced landing wheels for supporting the forward end of the aircraft when it is grounded, a caster wheel for supporting the tail of the aircraft when it is grounded, common means selectively to control the speed of rotation of each landing wheel for steering the aircraft when it is grounded, means connected to the common means for steering the aircraft while it is in flight a throttle lever for regulating the power output of the aircraft power unit and means actuated by the throttle lever to render the common means inoperative relative to the landing wheels when the throttle lever is moved to flying position.

2. Aircraft which includes a rudder for steering the aircraft while it is in flight, ailerons adapted to cooperate with the rudder when the aircraft is in flight, a pair of spaced landing wheels for supporting the forward end of the aircraft when it is grounded, means for retarding the rotation of one or the other of the landing wheels coincident with the operation of the rudder and the ailerons, a throttle lever to regulate the power output of the power unit of the aircraft, and means actuated by the throttle lever to disengage the wheel-retarding means when the throttle is moved to flying position.

3. Aircraft which includes a rudder for steering the aircraft while it is in flight, ailerons adapted to cooperate with the rudder when the aircraft is in flight, a pair of spaced landing wheels for supporting the forward end of the aircraft when it is grounded, a throttle lever for regulating the speed of operation of the aircraft power unit, brake means for retarding the rotation of one or the other of the landing wheels when the aircraft is grounded, and means operated by the throttle lever for releasing the brake means when the throttle lever is moved to flying position.

4. Aircraft which includes a rudder for steering the aircraft while it is in flight, ailerons adapted to cooperate with the rudder when the aircraft is in flight, a pair of spaced landing wheels for supporting the forward end of the aircraft when it is grounded, a throttle lever for regulating the speed of operation of the aircraft power unit, a brake for each landing wheel, means for applying one or the other of the brakes coincident with the operation of the rudder and ailerons, and means operated by the throttle lever partially to release the brake-applying means when the throttle lever is moved to flying position.

5. Aircraft which includes a rudder for steering the aircraft while it is in flight, ailerons adapted to cooperate with the rudder when the aircraft is in flight, a pair of spaced landing wheels for supporting the forward end of the aircraft when it is grounded, a steering wheel, cables controlled by the movements of the steering wheel to control the rudder, cables actuated by the wheel to move the ailerons coincident to the movements of the rudder, cables actuated by the steering wheel to retard the rotation of one or the other of said landing wheels coincident with the movements of the rudder, a throttle lever to regulate the speed of movement of the aircraft, and means actuated by the throttle lever to release the tension on the cables governing the wheel rotation-retarding means when the throttle lever is moved to flying position.

6. Aircraft which includes a rudder for steering the aircraft while it is in flight, ailerons adapted to cooperate with the rudder when the aircraft is in flight, a pair of spaced landing wheels for supporting the forward end of the aircraft when it is grounded, a steering wheel, cables controlled by the movements of the steering wheel to control the rudder, cables actuated by the wheel to move the ailerons coincident to the movements of the rudder, cables actuated by the steering wheel to retard the rotation of one or the other of said landing wheels coincident with the movements of the rudder, means to release the tension on the cables governing the wheel rotation-retarding means when the aircraft is in flight, a throttle lever for regulating the speed of operation of the aircraft power unit, and means actuated by the throttle lever for releasing the tension on the brake-actuating cables when the throttle lever is moved to flying position.

EDGAR BERNARD TODD.

REFERENCES CITED

The following references are of record in the file of this patent:

UNITED STATES PATENTS

| Number | Name | Date |
|---|---|---|
| 1,662,306 | Fokker | Mar. 13, 1928 |
| 2,074,730 | Kerr | Mar. 23, 1937 |
| 2,340,237 | Upson | Jan. 25, 1944 |
| 2,355,026 | Koppen | Aug. 1, 1944 |
| Re. 22,674 | Noonan | Sept. 18, 1945 |